United States Patent [19]

Patterson

[11] 4,040,539
[45] Aug. 9, 1977

[54] COOKING UTENSIL
[76] Inventor: Silla Patterson, 6959 S. Union Ave., Chicago, Ill. 60621
[21] Appl. No.: 677,160
[22] Filed: Apr. 15, 1976
[51] Int. Cl.² .................... B65D 25/08; B65D 1/24
[52] U.S. Cl. .................................... 220/22; 206/219
[58] Field of Search ............. 220/20, 22, 22.1, 22.2, 220/22.3, 23.8; 206/219, 221
[56] References Cited
U.S. PATENT DOCUMENTS

| 1,706,334 | 3/1929 | Toch | 220/22 |
| 2,081,078 | 5/1937 | Watson | 220/22.3 |
| 2,096,825 | 10/1937 | Roman | 220/23.8 |
| 2,641,912 | 6/1953 | Lawler | 220/23.8 |
| 3,079,028 | 2/1963 | Rosner | 220/22 |
| 3,107,027 | 10/1963 | Hong | 220/23.8 |
| 3,357,623 | 12/1967 | Wommelsdorf | 229/52 A |
| 3,373,917 | 3/1968 | Cox | 229/52 A |
| 3,491,986 | 1/1970 | Plett | 220/20 |
| 3,856,138 | 12/1974 | Maekawa | 206/221 |

Primary Examiner—George E. Lowrance

[57] ABSTRACT

The present invention relates to a cooking utensil for packaging a plurality of food ingredients with one another to be mixed and subsequently cooked. In one embodiment, the cooking utensil is disposable.

Various wet or dry components are packaged in the compartments and when ready for use the compartment walls are removed and the food components mixed after which they are cooked in the utensil.

10 Claims, 4 Drawing Figures

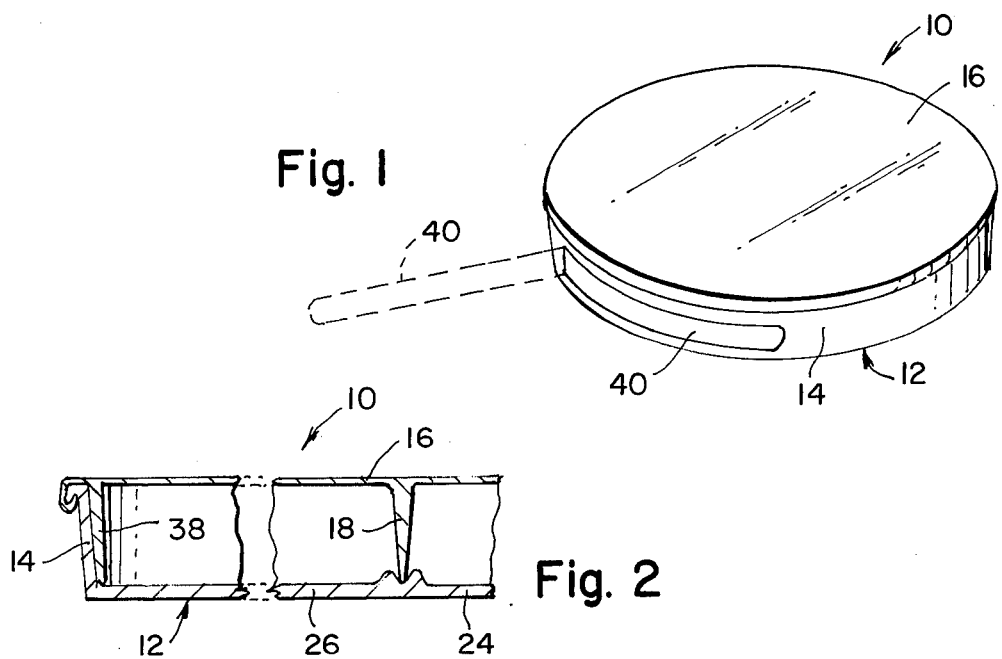
Fig. 1
Fig. 2
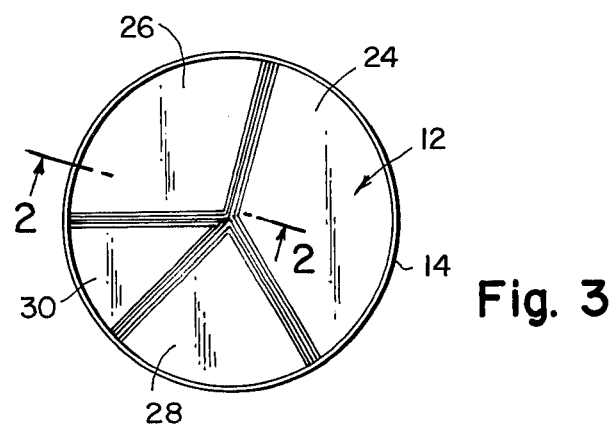
Fig. 3
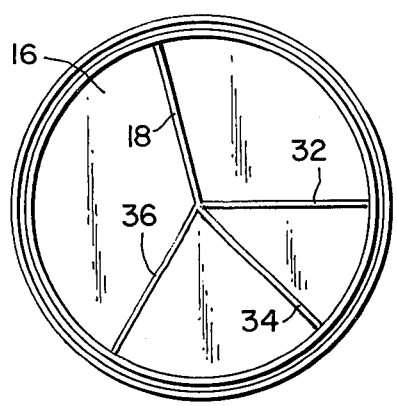
Fig. 4

COOKING UTENSIL

SUMMARY OF THE INVENTION

The present invention relates to a cooking utensil for packaging a plurality of food ingredients to be mixed with one another and subsequently cooked comprising a container having a bottom wall and a side wall extending around the periphery of the bottom wall. A cover for enclosing the container is provided, the cover having compartment dividers projecting downwardly from the cover into the bottom wall of the container, divider receiving members being positioned on the bottom wall for sealingly engaging the dividers whereby when the cover is on the container the dividers and the divider receiving members are engaged to form a plurality of compartments for holding food ingredients to be mixed so that when the cover is removed the dividers are removed from the container and the contents of the compartments may be readily mixed with one another and cooked.

The divider receiving members in one embodiment may comprise a slot in the bottom wall of the container, the slot optionally containing a polymeric sealant therein for temporarily sealing the divider to the slot. In another embodiment the divider receiving member comprises a polymeric sealant for temporarily sealing the divider to the bottom wall.

A collapsible handle member may be secured to the side wall.

BRIEF DESCRIPTION OF THE SEVERAL VIEWS OF THE DRAWING

FIG. 1 is a perspective view of a cooking utensil for packaging a plurality of food ingredients to be mixed with one another and subsequently cooked comprising a container with a plurality of compartments formed by dividing members projecting downwardly from the cover of the container, a collapsible handle extending from one of the side walls of the container being shown in phantom configuration according to one embodiment of the present invention;

FIG. 2 is a side elevation in section taken along the line 2—2 of the plan view of FIG. 3 according to another embodiment of the present invention;

FIG. 3 comprises a plan view of a cooking utensil for packaging a plurality of food ingredients to be mixed with one another and subsequently cooked comprising a container having a plurality of receiving members divider projecting from the bottom of the container according to one embodiment of the present invention; and FIG. 4 comprises a bottom plan view of a lid for a cooking utensil illustrated in FIG. 3 having dividing members projecting therefrom according to another embodiment of the present invention.

DETAILED DESCRIPTION

Many pre-packaged food mixes such as cake mixes and the like cannot use fresh ingredients such as cream, eggs or butter for the reason that there is no practical way to convert ingredients such as the aforementioned into dry componenets and retain their natural flavor in a pre-packaged mix.

Additionally, if wet ingredients were to be mixed with dry ingredients into a batter the consumer would be in doubt as to the various components and additionally batters would be difficult to store unless refrigerated. The other difficulty encountered in marketing a pre-packaged batter is that the consumer is prevented from performing a mixing operation thereby depriving them of involvement in one of the essential steps in the preparation of the food item. The marketability of the produce would be greatly enhanced if the ingredients for a food item could be supplied in a form which is readily and conveniently mixed and which allows the consumer to become involved in this mixing operation.

Additionally, some batters which are pre-mixed and stored even under refrigeration or in sterilized hermetically sealed containers do not store very well because of the alteration of some dry ingredients when exposed to liquid ingredients for any length of time. For example, flour when exposed to a liquid such as milk for any length of time tends to gelatinize and its cooking properties are thereby altered.

It is therefore an object of the present invention to overcome these and other difficulties encountered in the prior art.

It is a further object of the invention to provide a novel cooking utensil having a plurality of compartments for the storage of food ingredients prior to their mixing, the compartment walls being removable prior to mixing and cooking.

It is a further object of the present invention to provide a novel cooking utensil of the foregoing description which is also disposable.

These and other objects have been achieved according to the present invention and will become apparent from the disclosure and claims that follow as well as the appended drawing.

Referring to the appended drawing, a cooking utensil 10 is illustrated having a bottom wall 12 and a side wall 14 extending around the periphery thereof. A cover 16 fits over the pan and has a plurality of dividers 18, 32, 34 and 36 projecting downwardly therefrom into divider receiving members on bottom wall 12. For example, member 24 and 26 form a slot for receiving divider 18; members 30 and 26 forming a slot to receive divider 32; members 28 and 30 also forming a slot for receiving dividing member 34. Members 28 and 24 form a slot between them for receiving divider 36. The members 24, 26, 28, 30 may be made of the same material of manufacture as the bottom wall 12 of the cooking utensil and have a polymeric sealing compound in the slot formed between them, this polymeric compound comprising either a silicone rubber, a synthetic GRS or butadine rubber sealants, thiokol sealants or polyvinyl chloride plastisol sealants and the like.

Additionally, in order to form a better seal, the bottom of dividing members 18, 32, 34 and 36 may have ribs projecting laterally towards the side walls 14 of the cooking utensil in order to increase the surface area to which the polymeric sealant may be adhered or mechanically fastened.

Alternately, the members 24, 26, 28 and 30 for receiving the dividers 18, 32, 34 and 36 may be fabricated from the aforementioned polymeric material rather than the material from which the bottom wall 12 of a cooking utensil was manufactured.

A collapsible handle 40 is provided on the side wall 14 of the cooking utensil which may be folded inwardly against the side wall or extended as shown in the phantom configuration of FIG. 1. A side wall 38 projects downwardly from the periphery of the lid or cover 16 and is provided primarily to facilitate filling the compartments formed by the cover 16 prior to uniting cover 16 with the cooking utensil comprising bottom wall 12 and side walls 14.

The cover 16 and the pan comprising the bottom wall 12 and 14 preferably comprise light gauge aluminum so that the pan is relatively inexpensive to manufacture and may be disposed of after one use.

In use, the cooking utensil is employed to package a food product containing dry or liquid or a mixture of dry and liquid food compartments.

A fancy cornbread recipe is prepared and packaged in the cooking untensil of the present invention, the cornbread recipe comprising the following dry ingredients which are mixed together.

6 tables. corn flour
4 tables. flour
2 tables. of cake flour
2 tables of sugar
pinch of salt The lid illustrated in the appended drawings is inverted so that the various compartment dividers 18, 32, 34 and 36 and the side wall 38 project upwardly. The aforementioned dry ingredients are inserted into one of the compartments formed by the dividers and the side wall. The remaining compartments are then charged with one cup of cream, one beaten egg and two tablespoons of butter each component being placed in a separate compartment. The utensil comprising the bottom wall 12 and the side wall 14 is then placed over the lid and the compartments having the afore-mentioned ingredients therein and the periphery of the lid 16 secured to the side wall 14 as illustrated in FIG. 2.

The compartment dividers 18, 32, 34 and 36 may be sealed into the grooves formed for respectively by the members 24, 26, 28 and 30 by means of a nontoxic silicone rubber sealing material known in the art.

The cooking utensil may then be utilized as a packaging unit for holding the various components in the compartments until reaching the point of purchase by the consumer. Because of the components of the aforementioned recipe contained in the combined cooking utensil and package are perishable, they must be stored under refrigeration.

Prior to use, the lid 16 is removed from the container along with the compartment dividers and the ingredients in the various compartments formed by dividing members 18, 32, 34 and 36 stirred until thoroughly mixed. The mixed ingredients are then placed in an oven at 350° F. for about 30 minutes or until brown after which the cornbread may be removed from the container or utensil and the utensil disposed of.

Although the invention has been described by reference to some embodiments, it is not intended that the novel apparatus be limited thereby but that modifications thereof are intended to be included as falling within the broad scope and spirit of the foregoing disclosure the following claims and the appended drawing.

What is claimed is:

1. A cooking utensil for packaging a plurality of food ingredients to be mixed with one another and subsequently cooked comprising container means having bottom wall means and first side wall means extending around the periphery of said bottom wall means, cover means for closing said container, compartment divider means projecting downwardly from said cover means into said bottom wall means, second side wall means extending around said cover means and projecting downwardly, said second side wall means having an inner face and an outer face, said inner face being sealed to the ends of said divider means to form compartments projecting downwardly from said cover means, said first side wall means and said second side wall means abuttingly engageable with one another, said cover means being sealable to the free end of said first side wall means, divider receiving means positioned on said bottom wall means for sealingly engaging said divider means whereby when said cover means is on said container means, said divider means and said divider receiving means being engageable to form a plurality of compartments sealed on all sides for holding food ingredients to be mixed so that when said cover means is removed said divider means are removed from said container means and the contents of said compartments may be readily mixed with one another in said container means and cooked.

2. The cooking utensil of claim 1 where said divider receiving means comprises slot means in said bottom wall of said container.

3. The cooking utensil of claim 2 where said slot means have polymeric sealing means therein for temporarily sealing said divider to said slot.

4. The cooking utensil of claim 1 where said divider receiving means comprises polymeric sealing means for temporarily sealing said divider to said bottom wall.

5. The cooking utensil of claim 1 where said side wall has collapsible handle means secured thereto.

6. The cooking utensil of claim 2 where said side wall has collapsible handle means secured thereto.

7. The cooking utensil of claim 3 where said side wall has collapsible handle means secured thereto.

8. The cooking utensil of claim 4 where said side wall has collapsible handle means secured thereto.

9. The cooking utensil of claim 1 comprising a disposable cooking utensil.

10. The cooking utensil of claim 5 comprising a disposable cooking utensil.

* * * * *